Feb. 3, 1959 L. C. MINUTILLA 2,871,903
TRACTION GRIP DEVICE FOR MOTOR VEHICLE TIRES
Filed June 6, 1956

INVENTOR.
Leon C. Minutilla
BY
*L. S. Saulsbury*
ATTORNEY

United States Patent Office 2,871,903
Patented Feb. 3, 1959

2,871,903
TRACTION GRIP DEVICE FOR MOTOR VEHICLE TIRES

Leon C. Minutilla, Brooklyn, N. Y.

Application June 6, 1956, Serial No. 589,817

1 Claim. (Cl. 152—226)

This invention relates to a traction grip device for motor vehicle tires.

It is the principal object of the present invention to provide a traction grip device for motor vehicle tires in the form of a heavy spring steel clip having separable ends adapted to fit over the tire in which each of the ends are provided with an anti-friction roller to facilitate the sliding engagement of the ends over the side wall of the tire and over the tire rim into locking engagement with the peripheral lip thereof whereby the grip device will be held in place by the spring action of the clip.

It is another object of the invention to provide a traction device that can be put on the tire or removed therefrom in a matter of seconds by man, woman, or child, and in any number desired and wherein the one size device may fit several different size tires.

It is still another object of the invention to provide in a traction grip device for motor vehicle tires that is easy to secure to the tire and which when secured, does not have parts that are loose on the tire, like with ordinary chains, so as to cause injury to fenders and brake assemblies of the vehicle.

It is further object of the invention to provide a traction grip device for vehicle tires that has a smooth inner face and fits flush upon the tire tread surface, and which will not break down the reinforcing cords of tires of the low pressure or tubeless tire type.

It is a still further object of the invention to provide a traction grip device that is in the form of spring metal layers which are held together by screws extending into the assembly from the inner side of the device and thereby locked in place when the device is on the tire and which can, upon becoming worn, be replaced by new external roughened layer.

Other objects of the invention are to provide a traction grip device for vehicle tires having the above objects in mind which is of simple construction, inexpensive to manufacture, has a minimum number of parts, formed of a plurality of different length spring steel layers built up one upon another, easy to apply to the tire, efficient and effective in use.

Figure 1:
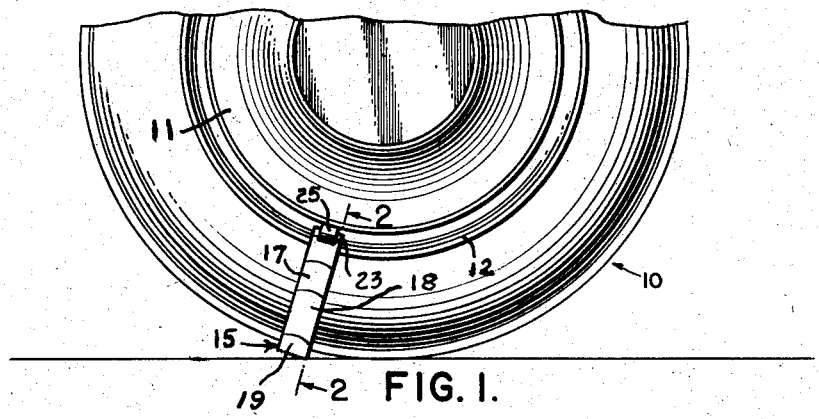
Figure 2:
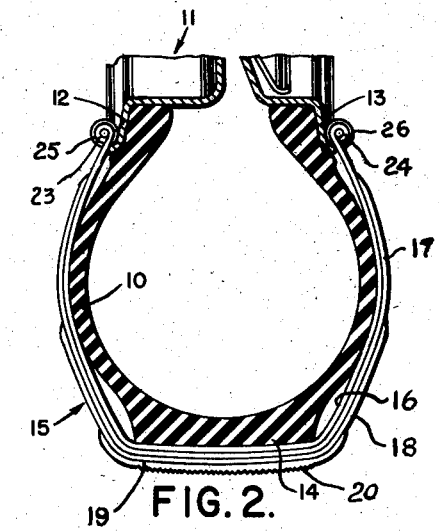
Figure 3:
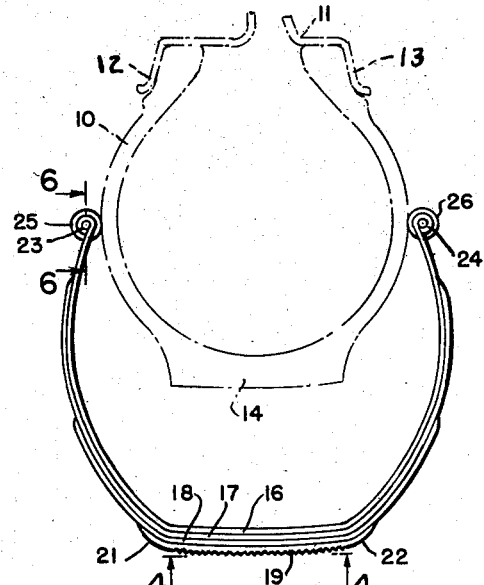
Figure 5:
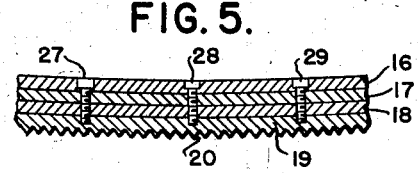
Figure 4:
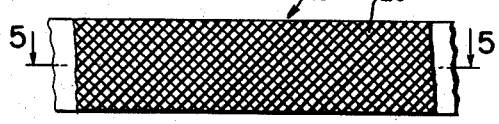
Figure 6:
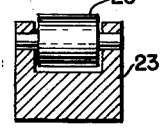

For other objects and a better understanding of the invention, reference may be had to the following detailed description taken in connection with the accompanying drawing in which Figure 1 is a side elevational view of a tire and its rim and of one traction grip device of the present invention applied thereto, Fig. 2 is an enlarged sectional view taken through the tire and rim on line 2—2 of Fig. 1 and looking in elevation upon the tire grip device with its end rollers locked over the peripheral lip of the tire rim, Fig. 3 is an elevational view of the traction grip device illustrating the manner in which the grip device is expanded and being applied to the tire, the tire and its rim being shown in phantom, Fig. 4 is an enlarged bottom plan view of the external roughened layer and as viewed upon line 4—4 of Fig. 3, Fig. 5 is a transverse sectional view of the traction grip device as viewed on line 5—5 of Fig. 4, and Fig. 6 is an enlarged sectional view of the device the view being taken on line 6—6 of Fig. 3 through engaging roller end thereof, the roller being shown in full lines.

Referring now to the figures, 10 represents a vehicle tire that is supported upon a demountable tire rim 11 having peripheral side lips 12 and 13. The tire 10 engages the side lips in the usual manner and has a squared tread surface 14. According to the present invention a traction grip device, indicated generally at 15, has been made that is adapted to be fitted over the tire and rim lip and have spring tight clamping engagement therewith. This traction grip device 15 is formed of three U-shaped spring steel, different length, unitary layers 16, 17 and 18. The inner spring layer 16 has its ends of sufficient length so that when the device is mounted on the tire with the inner face thereof made flush with the tread, the ends are extended over and locked with the peripheral side lips 12 and 13 of the tire rim 11. The intermediate spring layer 17 has its ends shorter than the ends of the inner layer 16 and the outer spring layer 18 has its ends still shorter than the ends of the intermediate layer 17. These spring members thus have their ends overlapping with one another and are nested in tight spring grip relationship with each other.

Over the outer layer 18 and across the portion adjacent to the tread of the tire, there is applied to these spring layers an external roughened wear plate or layer 19 having a rasp-like or knurled surface 20 and short ends 21 and 22 bent over the outer surface of the outer layer 18. This assembly is held together by three Allen type screws 27, 28 and 29 which extend from the inner face of the inner layer 16 and into threaded holes in the several spring layers 16, 17 and 18 and the wear plate or layer 19. By having these screws inserted from the inner layer outwardly they are retained or locked in place while tire grip device is on the tire and are thereby prevented from being lost. They may be loosened at times when it is desired to replace the wear plate 19 with another wear plate.

The ends of the inner layers, as indicated at 23 and 24 respectively rolled upon themselves and journalled therein have rollers 25 and 26 which allow the spring ends to be more easily forced down over the tire and over the peripheral lips 12 and 13 of the tire rim 11. In fact, it makes possible the assembly of a traction grip, which is made of heavy spring layers upon the tire, upon installing the traction grip device upon the tire, the device is placed upon the ground either in front of or in rear of the tire and thereafter driving the vehicle and the tire into the device. By forcing the device with a tool to pull the roller over the rim lips, the device can be readily removed from the tire.

It should now be apparent that the entire assembly provides for a heavy spring traction grip device that has separable ends with rollers thereon that may be applied to the tire and its rim in the illustrated manner in Fig. 3. The size of the spring elements and spring action is such as to maintain a firm and solid grip of the device upon the tire rim and be locked in place over the peripheral lips of the tire rim.

While various changes may be made in the detail construction, it shall be understood that such changes shall be within the spirit and scope of the present invention as defined by the appended claim.

What is claimed is:

A traction grip device for a motor vehicle wheel with a pneumatic tire mounted on a demountable rim comprising unitary layers of spring steel of U-shape and of varying lengths, the layers being nested in one another with the innermost layer being longer than the other layers and the other layers being progressively shorter, said grip device adapted to conform to the shape of the tire and the ends thereof being separable to permit the extension of the grip device over the tire and over the peripheral lips of the tire rim for locking engagement therewith, a wear plate assembled upon the layers over the tread engaging portion of the device, means for securing the layers and the wear plate together against displacement from each other, and anti-friction rollers journalled on the ends of the innermost layer and adapted to ride over the peripheral lips of the tire rim and lock thereunder upon the traction device being assembled upon the tire and rim.

References Cited in the file of this patent

UNITED STATES PATENTS

| | | |
|---|---|---|
| 888,269 | Stevens | May 19, 1908 |
| 2,437,040 | Prevost et al. | Mar. 2, 1948 |
| 2,501,973 | Seymour | Mar. 28, 1950 |
| 2,696,237 | Doughty | Dec. 7, 1954 |

FOREIGN PATENTS

| | | |
|---|---|---|
| 1,062,870 | France | Dec. 9, 1953 |